April 14, 1931.  A. RUSH  1,801,247

PROTECTIVE COVER FOR AUTOMOBILES

Filed June 19, 1928

Inventor
ALBERT RUSH
By Fincaef & Fincaef
his Attorneys

Patented Apr. 14, 1931

1,801,247

UNITED STATES PATENT OFFICE

ALBERT RUSH, OF COLUMBUS, OHIO; FRANK A. HUNTER AND RUBY B. RUSH ADMINISTRATORS OF SAID ALBERT RUSH, DECEASED

PROTECTIVE COVER FOR AUTOMOBILES

Application filed June 19, 1928. Serial No. 286,655.

The object of this invention is, more especially, to provide an improved and simplified cover for an automobile to protect it against an accumulation of dust and other objects when standing in a garage or paint shop.

The invention is embodied in the example herein shown and described.

In the accompanying drawing—

Figure 1:
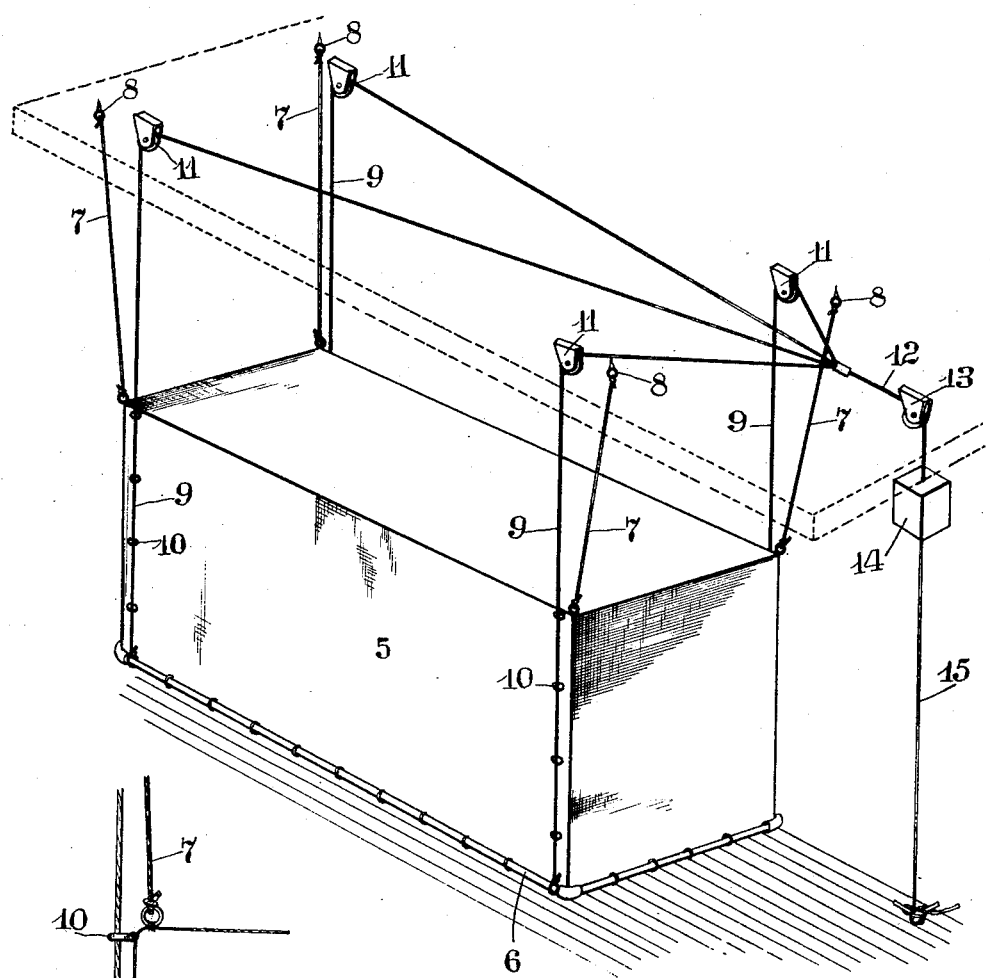
Figure 1 illustrates the invention in perspective view.

In the views 5 designates the body of the hood or cover which is constructed of five rectangular pieces of suitable fabric, such as duck, canvas or other stout or impervious material adapted to prevent the passage of dust therethrough, said pieces being stitched or otherwise secured together to form a hood of rectangular parallelepiped form open at its bottom. The lower edge of the hood has secured in or to it a rectangular metallic frame 6 conveniently of pipe of considerable weight adapted to hold the hood distended when properly sustained at its upper part. The means for sustaining the hood at its upper part consists of four flexible suspending cables 7 each of which is connected with a corner of the hood and to a stout screw eye or other suitable member 8 in the ceiling (indicated by broken lines Fig. 1) of the garage. The cords are extended in a slant to the vertical outwardly and diagonally as respects the top of the hood from the upper corners thereof so as to keep the top of the cover as evenly stretched as practicable.

Figure 2:
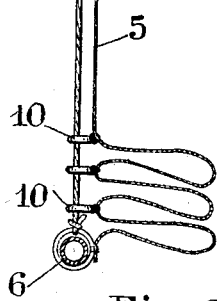
Figure 2 is a sectional view of a fraction of the cover showing it drawn up at the bottom.

To each of the four corners of the bottom frame is attached a cord or cable 9 passed up through a series of rings 10 and over a pulley 11 attached to the ceiling, all four of the cables 9 being joined to a single cable 12 passed over a pulley 13 (also attached to the ceiling) where said cable 12 is provided with a counterbalancing weight 14. The weight 14 is better such as not to fully counterbalance the metallic bottom frame so that said frame shall tend to keep the cover down. To hold the cover up so that the automobile can be cleaned or painted or removed from under it the weight has attached to it a cord 15 that can be engaged with a cleat in the floor. When, therefore, it is desired to raise the cover the weight is pulled down thereby drawing up the bottom frame until it and the cover are above the plane of the top of the automobile and causing the fabric of the cover to gather up as suggested in Fig. 2. To inclose an automobile the operation is the reverse, it being only necessary to release the weight from its attachment with the floor whereupon the weight of the bottom frame draws down the fabric. The fabric-sustaining cables 7 permit the cover to be drawn up beyond the suspending plane to the ceiling if necessary.

The device can be used to protect objects other than automobiles and the forms of the parts can be changed without departing from the gist of the invention as claimed.

What I claim is:

A protecting device of the class described, consisting of a flexible cover of rectangular form open at its bottom, a unitary endless weighting bar of fixed rectangular form conforming to and attached to the bottom edge of the cover and extending entirely therearound, suspending means for the cover consisting of four cords, one connected to each of the four upper corners of the covers, said cords diverging from one another upwardly and each lying in a substantially vertical diagonal plane intersecting the top of the cover and attached to a fixed point to keep the top of the cover stretched to rectangular form, flexible hoisting cables attached to the four corners of the bottom of the cover, and a series of rings attached externally to each of the four corners through which said hoisting cables are passed.

ALBERT RUSH.